US010012349B2

(12) United States Patent
Takahashi et al.

(10) Patent No.: US 10,012,349 B2
(45) Date of Patent: Jul. 3, 2018

(54) LIQUEFIED NATURAL GAS FILLING DEVICE

(71) Applicant: Tatsuno Corporation, Tokyo (JP)

(72) Inventors: Kazushi Takahashi, Tokyo (JP); Tsuyoshi Koike, Tokyo (JP); Takeshi Ozeki, Tokyo (JP)

(73) Assignee: TATSUNO CORPORATION, Tokyo (JP)

( * ) Notice: Subject to any disclaimer, the term of this patent is extended or adjusted under 35 U.S.C. 154(b) by 0 days.

(21) Appl. No.: 15/028,001

(22) PCT Filed: Mar. 31, 2015

(86) PCT No.: PCT/JP2015/060116
§ 371 (c)(1),
(2) Date: Apr. 7, 2016

(87) PCT Pub. No.: WO2015/152238
PCT Pub. Date: Oct. 8, 2015

(65) Prior Publication Data
US 2017/0009939 A1 Jan. 12, 2017

(30) Foreign Application Priority Data

Apr. 4, 2014 (JP) ................................. 2014-077737

(51) Int. Cl.
*F17C 5/02* (2006.01)
(52) U.S. Cl.
CPC .......... *F17C 5/02* (2013.01); *F17C 2201/056* (2013.01); *F17C 2201/058* (2013.01);
(Continued)
(58) Field of Classification Search
CPC ....................................................... F17C 5/02
(Continued)

(56) References Cited

U.S. PATENT DOCUMENTS 4,791,682 A * 12/1988 Herr ....................... A41D 19/01
2/159
5,301,723 A * 4/1994 Goode ....................... F17C 5/02
141/11
(Continued)

FOREIGN PATENT DOCUMENTS

JP 63125896 A 5/1988
JP 63125896 U 8/1988
(Continued)

OTHER PUBLICATIONS

International Search Report for PCT/JP2015/060116, dated Jun. 30, 2015.
(Continued)

*Primary Examiner* — Timothy L Maust
(74) *Attorney, Agent, or Firm* — Stetina Brunda Garred and Brucker

(57) ABSTRACT

An LNG filling apparatus that can safely fill LNG in LNG vehicles. A filling apparatus 1 for filling LNG in an in-vehicle tank, the apparatus 1 having a housing 2, a recovery hose 41 and a filling hose 51 separately led from the housing, a recovery mechanism 4 for recovering a natural gas from the in-vehicle tank via the recovery hose, and a filling mechanism 5 for filling LNG to the in-vehicle tank via the filling hose. Separately leading the recovery hose and the filling hose from the housing with these hoses in close proximity to each other allows a range capable of filling that is the overlap range between a connectable range of the recovery hose and a connectable range of the filling hose to be enlarged. A single hose led from the housing can be used for both of the recovery of the natural gas and the filling of the LNG, which prevents tangle of hoses with each other, and enables to fill the LNG in the in-vehicle tank safely.

11 Claims, 8 Drawing Sheets

(52) U.S. Cl.
CPC .............. *F17C 2205/037* (2013.01); *F17C 2205/0335* (2013.01); *F17C 2205/0364* (2013.01); *F17C 2221/012* (2013.01); *F17C 2221/033* (2013.01); *F17C 2223/0161* (2013.01); *F17C 2223/033* (2013.01); *F17C 2225/0161* (2013.01); *F17C 2225/033* (2013.01); *F17C 2227/0135* (2013.01); *F17C 2250/043* (2013.01); *F17C 2250/075* (2013.01); *F17C 2265/065* (2013.01); *F17C 2270/0168* (2013.01); *F17C 2270/0184* (2013.01)

(58) Field of Classification Search
USPC ..................... 141/3, 20, 86; 137/312–314
See application file for complete search history.

(56) References Cited

U.S. PATENT DOCUMENTS

| | | | | |
|---|---|---|---|---|
| 5,353,849 A * | 10/1994 | Sutton | ............... | F17C 5/007 141/18 |
| 5,765,602 A * | 6/1998 | Sutton | ............... | F17C 5/007 141/207 |
| 6,178,992 B1 * | 1/2001 | Van Der Paal | .... | B65H 75/4486 137/355.2 |
| 6,196,280 B1 * | 3/2001 | Tate, Jr. | ............... | B60K 15/04 141/301 |
| 6,899,146 B2 * | 5/2005 | Bingham | ............... | F17C 7/02 141/11 |
| 7,111,636 B2 * | 9/2006 | Hutchinson | ......... | B67D 7/3209 137/15.11 |
| 8,191,586 B2 * | 6/2012 | Huval | ............... | B60S 5/046 141/38 |
| 2002/0104581 A1 | 8/2002 | Drube et al. | | |
| 2014/0261867 A1 * | 9/2014 | Lambrix | ............... | F17C 13/025 141/4 |
| 2014/0261882 A1 * | 9/2014 | Lambrix | ............... | B67D 7/04 141/94 |

FOREIGN PATENT DOCUMENTS

| | | |
|---|---|---|
| JP | 176976 | 6/1998 |
| JP | 10176796 A | 6/1998 |
| JP | 2013148197 A | 8/2013 |

OTHER PUBLICATIONS

Supplemental European Search Report for EP15774389, dated Nov. 13, 2017.

* cited by examiner

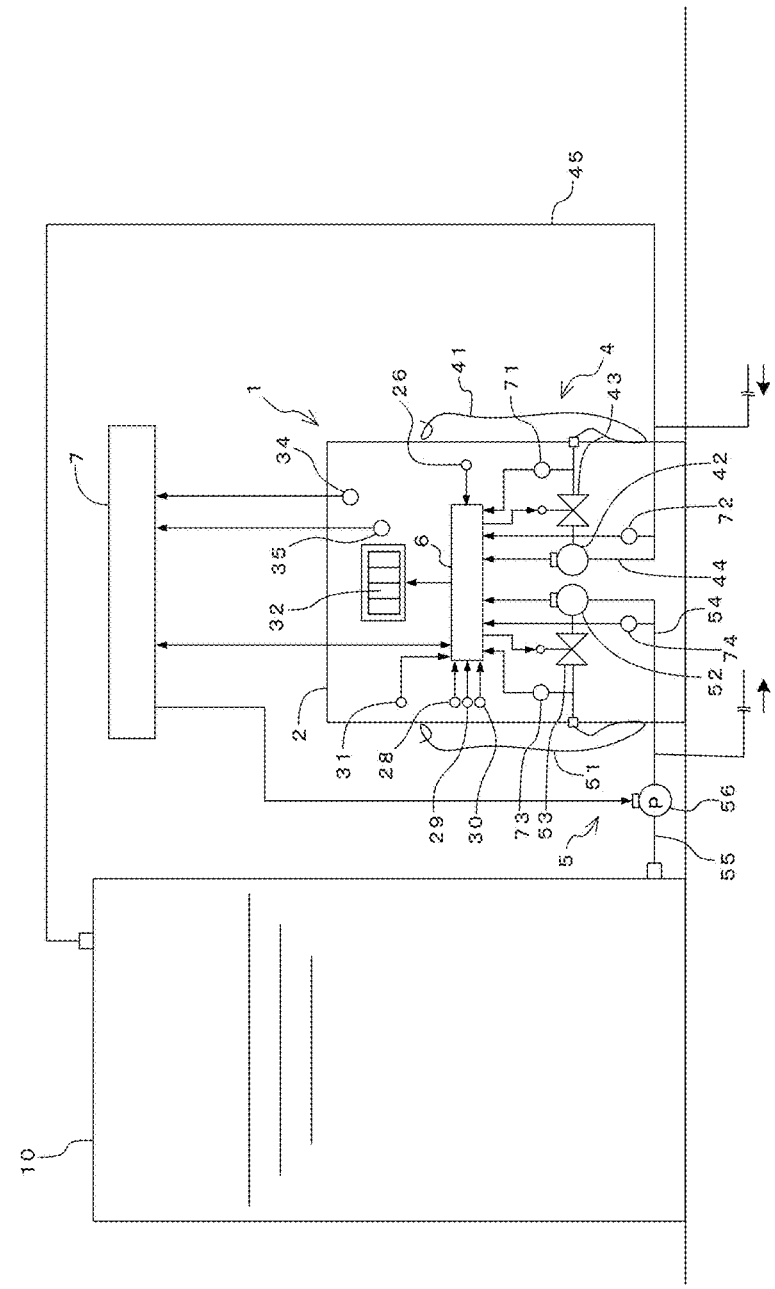
[Fig. 1]

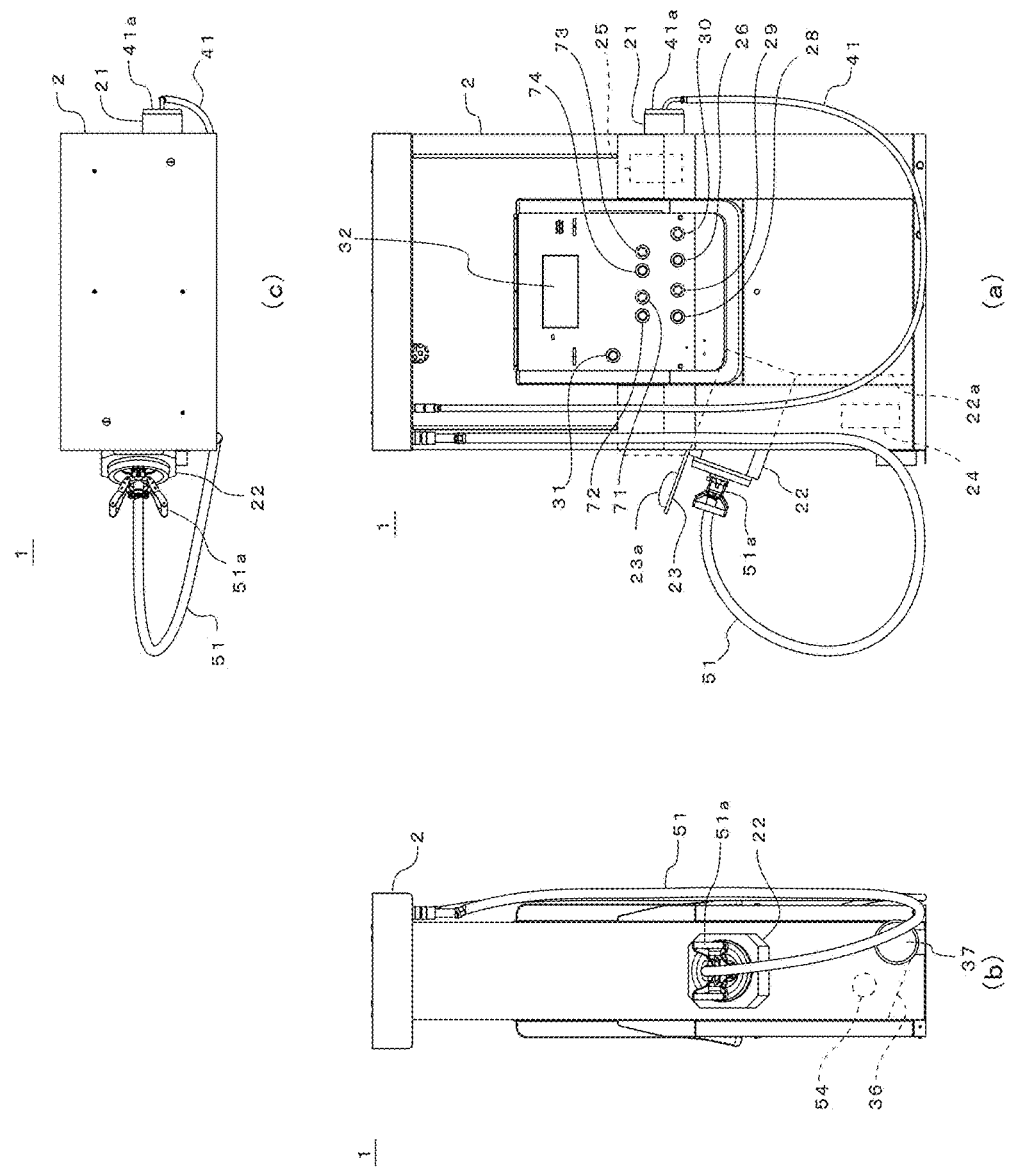
[Fig. 2]

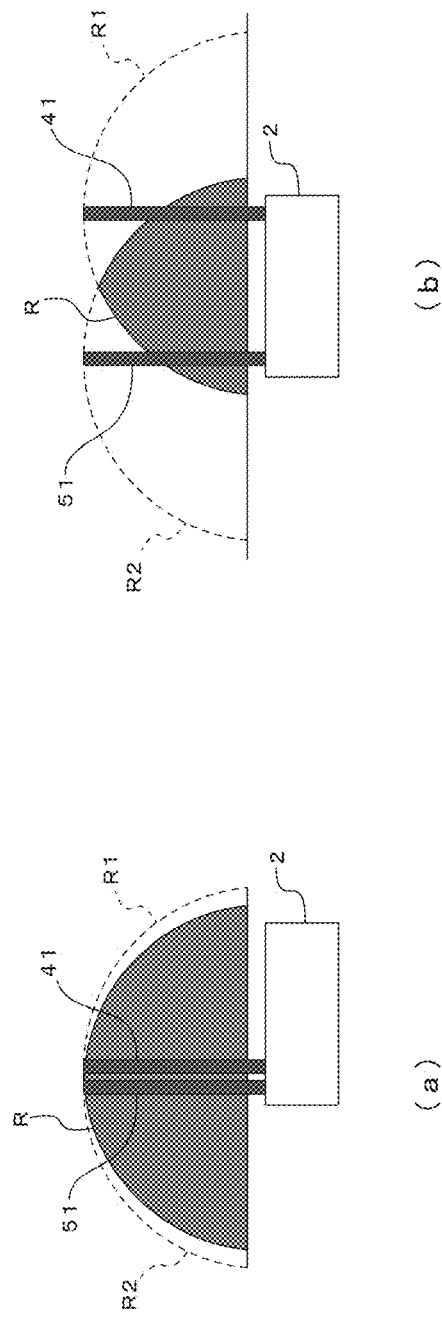

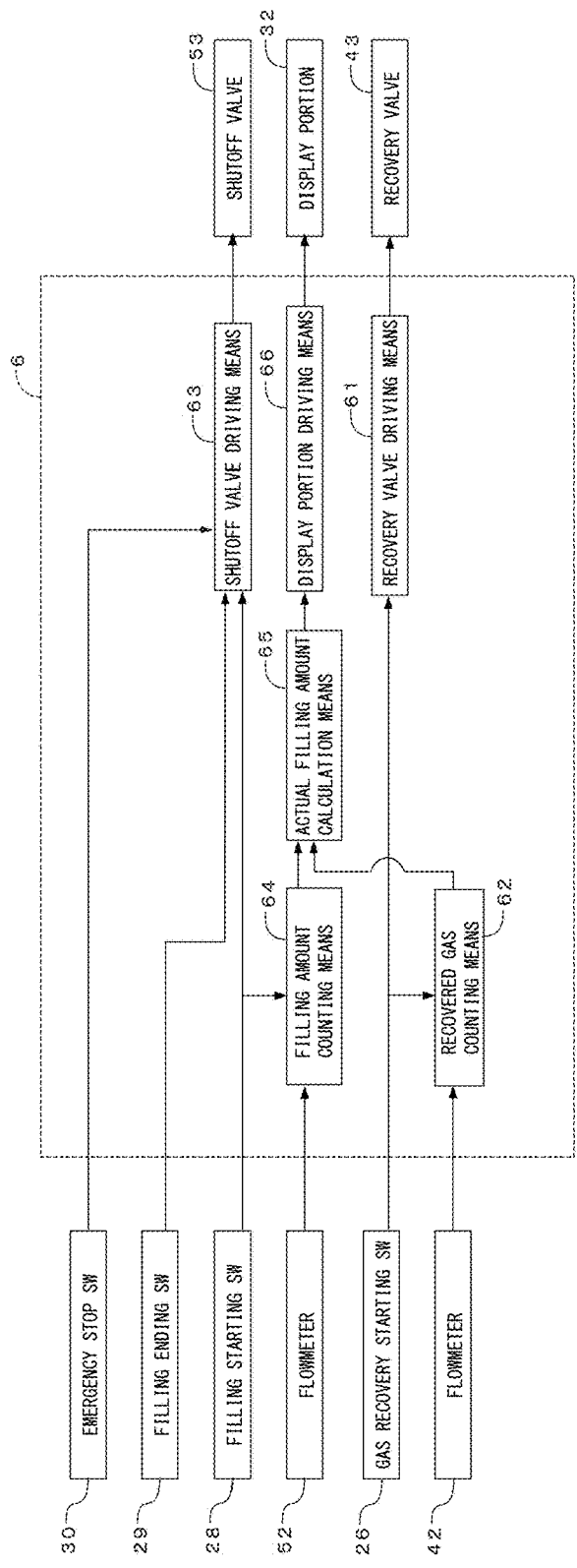
[Fig. 4]

[Fig. 5]
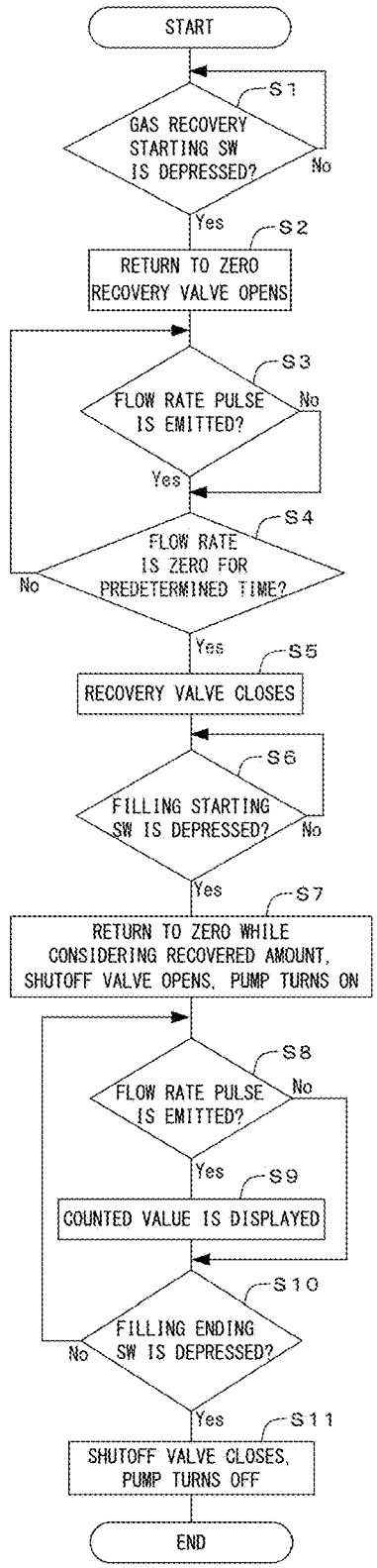

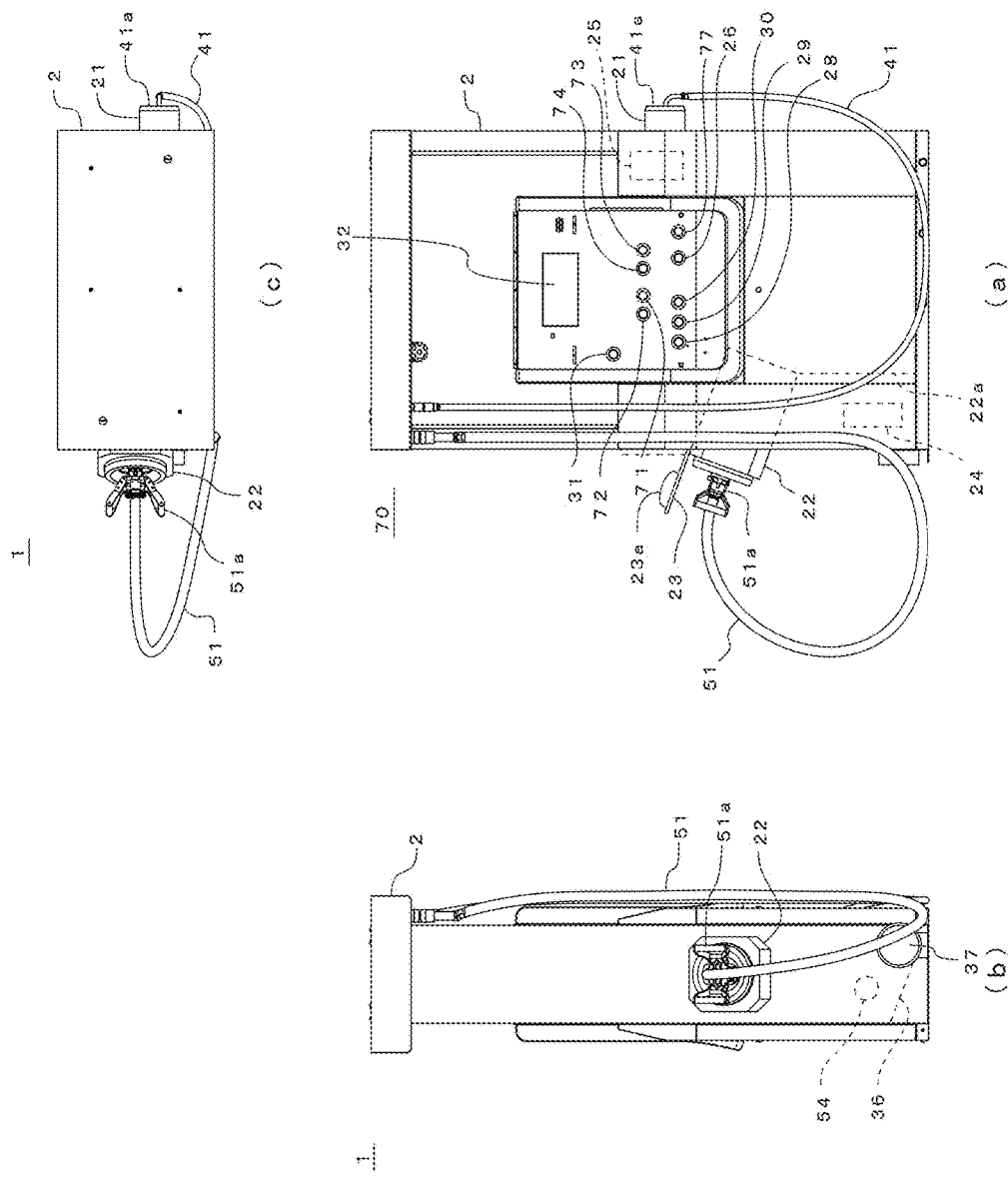
[Fig. 6]

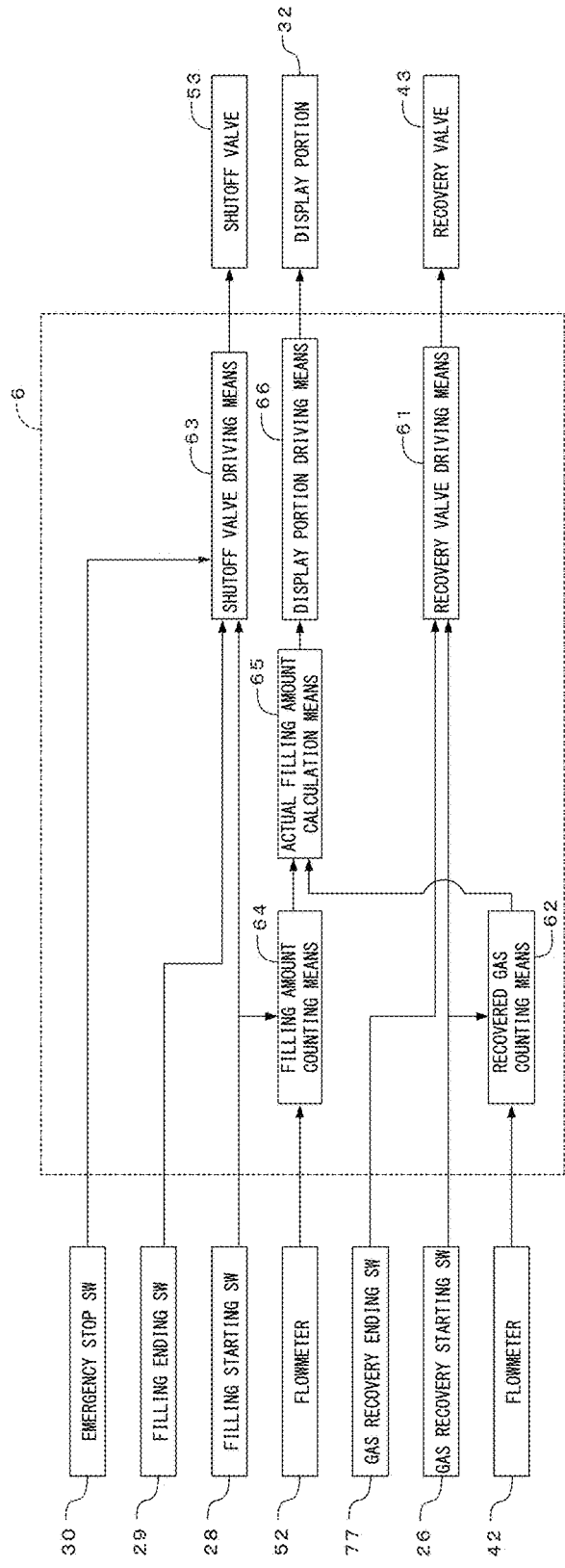
[Fig. 7]

[Fig. 8]
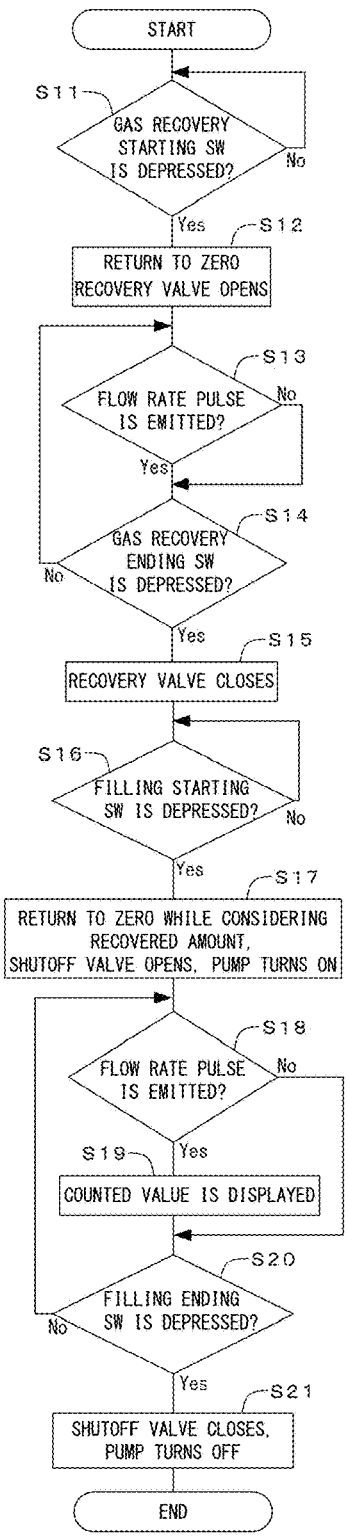

LIQUEFIED NATURAL GAS FILLING DEVICE

STATEMENT RE: FEDERALLY SPONSORED RESEARCH/DEVELOPMENT

Not Applicable

CROSS-REFERENCE TO RELATED APPLICATIONS

The present application claims priority to International Application No. PCT/JP2015/060116 filed on Mar. 31, 2015, which claims priority to Japanese Patent Application No. 2014-077737 filed Apr. 4, 2014.

BACKGROUND

1. Technical Field

The present invention relates to an apparatus for filling liquefied natural gas in a tank mounted on a vehicle.

2. Background Art

Due to recent soaring crude oil prices, developments regarding natural gas vehicles, fuel-cell-powered vehicles and the like that run on liquefied natural gas (hereinafter abbreviated as "LNG"), compressed natural gas (CNG), hydrogen and the like as alternatives to petroleum are actively advanced. With this, infrastructures for supplying fuel to the above vehicles etc. have been built, and the present applicant proposed an apparatus for effectively filling hydrogen fuel in an in-vehicle tank in Patent document 1.

Cooling natural gas to −162° C. allows its volume to become six hundredth of volume of that in gaseous state, so that LNG attracts attention in the above alternative fuels as an economic natural resource that can be transported and stored in a large quantity. LNG vehicles that run on the LNG is greatly different from typical vehicles in that the insides of their in-vehicle tanks are constantly maintained −162° C. or lower.

In addition, shale gas production in the United States of America increases supply of natural gas to drive down the price of the natural gas. With the price reduction of natural gas, a trend of cost saving that utilizes LNG less expensive than light gas oil has been expanding mainly in truckload transportation companies and the like.
PATENT DOCUMENT 1: Japanese Patent Publication 2013-148197 gazette

BRIEF SUMMARY

In order to store LNG in liquid state, it is necessary that the inside of the tank is maintained at a low temperature of −162° C., therefore, handling of LNG is greatly different from other fuels. In addition, infrastructures for supplying LNG are not built, and LNG vehicles do not become common in Japan, so that it is necessary to take care of users who are unfamiliar with filling LNG.

Then, the object of the present invention is to provide an LNG filling apparatus for safely filling LNG in LNG vehicles.

In order to attain the above-mentioned object, the present invention relates to an LNG filling apparatus for filling LNG in an in-vehicle tank, and the apparatus is characterized by having: a housing; a single hose led from the housing; a recovery mechanism for recovering natural gas from the in-vehicle tank via the hose; a filling mechanism for filling LNG in the in-vehicle tank via the hose; and a gloves mounting part on which gloves used by an operator of the liquefied natural gas filling apparatus are mounted and which prevents a nozzle at an end of the hose from being detached in case that the gloves are put on the gloves mounting part.

With the present invention, after natural gas in an in-vehicle tank is recovered, LNG can be filled in the in-vehicle tank. A single hose is used for the recovery and the filling, so that tangle of hoses does not occur. With this, breakage of the hose and leakages of LNG and natural gas can be prevented, and LNG can be safely filled in the in-vehicle tank. And, the gloves mounting part can prevent the operator from forgetting to wear the gloves.

In addition, an LNG filling apparatus for filling LNG in an in-vehicle tank of the present invention is characterized by having a housing; a recovery hose and a filling hose separately led from the housing; a recovery mechanism for recovering natural gas from the in-vehicle tank via the recovery hose; a filling mechanism for filling LNG in the in-vehicle tank via the filling hose; and a gloves mounting part on which gloves used by an operator of the liquefied natural gas filling apparatus are mounted and which prevents a filling nozzle at an end of the filling hose from being detached in case that the gloves are put on the gloves mounting part. With the present invention, after natural gas in an in-vehicle tank is recovered via the recovery hose, LNG can be filled in the in-vehicle tank via the filling hose, and the recovery and the filling can be performed by the exclusive hoses separately led from the recovery mechanism and the filling mechanism. And, the gloves mounting part can prevent the operator from forgetting to wear the gloves.

In the above LNG filling apparatus, the recovery hose and the filling hose can be separately led from the housing with these hoses in close proximity to each other. With this, a range capable of filling that is the overlap range between a connectable range of the recovery hose and a connectable range of the filling hose can be enlarged, and a range in front of a setting panel does not really interfere the recovery hose and the filling hose, which maintains a handleability of the setting panel in good condition.

In the above LNG filling apparatus, a backing plate for preventing droplets from falling below a filling pipe in the housing can be mounted. With this, in case that an interval between fillings is long, it is prevented that a pipe and the like positioned on a lower part in the housing become eroded by dropped water that is generated by melting frost attached to the filling pipe, and safety filling of LNG can be continued for a long period of time.

Further, the liquefied natural gas filling apparatus may further comprise: a ground wire for releasing electricity that is charged on the liquefied natural gas filling apparatus to an outside thereof to prevent generation of spark; and an air hose for removing dusts or/and frosts attached to the nozzle at the end of the hose or the filling nozzle at the end of the filling hose, wherein the ground wire and the air hose can be separately reeled on reels of automatic reeling type. With this, the ground wire and the air hose can be prevented from being intertwined with each other or with the hose, which prevents breakages of the ground wire, the air hose and the hose and leakages of LNG and natural gas due to their breakages.

As described above, with the present invention, it becomes possible to safely fill LNG in LNG vehicles.

BRIEF DESCRIPTION OF THE DRAWINGS

FIG. 1 is a schematic view showing a filling facility with an LNG filling apparatus according to the present invention.

FIG. 2 is an external view of the LNG filling apparatus shown in FIG. 1, in which (a) is a front view, (b) is a side view and (c) is a top view.

FIG. 3 is a schematic view showing the housing, the recovery hose and the filling hose shown in FIG. 1 to explain a range capable of filling.

FIG. 4 is a block diagram for explaining the construction of the control device shown in FIG. 1.

FIG. 5 is a flowchart for explaining the motion of the LNG filling apparatus according to the present invention.

FIG. 6 is a front view showing another embodiment of an LNG filling apparatus according to the present invention.

FIG. 7 is a block diagram for explaining the construction of the control device shown in FIG. 6.

FIG. 8 is a flowchart for explaining the motion of the LNG filling apparatus shown in FIG. 6.

DETAILED DESCRIPTION

FIG. 1 shows an example of a filling facility having an LNG filling apparatus according to the present invention, and the filling facility is provided with a filling apparatus 1, an LNG storage tank 10, a central control board 7 and others.

The filling apparatus 1 is, as shown in FIGS. 1 and 2, provided with a housing 2, a recovery mechanism 4 for recovering vaporized natural gas from an LNG in an in-vehicle tank, a filling mechanism 5 for filling an LNG stored in the LNG storage tank 10 to the in-vehicle tank, and a control device 6, installed in the housing 2, for controlling the whole filling apparatus 1.

The recovery mechanism 4 is provided with a recovery hose 41, led from the housing 2, having a connector 41a at a tip thereof, a pipe 44 for recovery, connected to the recovery hose 41, with a flowmeter 42 and a recovery valve 43, and a pipe 45 for connecting the pipe 44 to an upper portion of the LNG storage tank 10. The flowmeter 42 is installed to measure an amount of the natural gas recovered through the recovery hose 41, and has a flow rate pulse transmitter. In addition, to the pipe 44 are mounted two pressure gauges 71, 72 to monitor pressures in the pipe 44.

The filling mechanism 5 is provided with a filling hose 51 that is led from the housing 2 and has a filling nozzle 51a at a tip thereof; a pipe 54 for filling that is connected to the filling hose 51 and has a flowmeter 52 and a shutoff valve 53; a pipe 55 for connecting the pipe 54 to a lower portion of the LNG storage tank 10; and a filling pump 56 mounted to the pipe 55. These components become 0° C. or lower at a filling operation, so that their surfaces are frosted. The flowmeter 52 is installed to measure an amount of LNG filled in the in-vehicle tank via the filling hose 51, and has a flow rate pulse transmitter. The filling pump 56 is driven by a motor (not shown). In addition, to the pipe 54 are mounted two pressure gauges 73, 74 to monitor pressures in the pipe 54.

The recovery hose 41 and the filling hose 51 are, as shown in FIG. 2, led from top-left portions of the housing 2 with these hoses in close proximity to each other. With this, as shown in FIG. 3, a range R capable of filling that is the overlap range between a connectable range R1 of the recovery hose 41 and a connectable range R2 of the filling hose 51 can be enlarged as compared to a case that these hoses 41, 51 are arranged with these hoses apart from each other as shown in FIG. 3(b). In addition, separately arranging the connector 41a and the filling nozzle 51a on different sides of the housing 2 prevents these hoses 41, 51 from being intertwined with each other, and a range in front of a display portion 32 does not really interfere the recovery hose 41 and the filling hose 51.

Referring to FIGS. 1 and 2, the housing 2 is further provided with a connector hook 21, a nozzle hook 22, a gloves mounting part 23, a ground wire reeled on a ground reel 24, an air hose reeled on an air hose reel 25, switches 26, 28 to 31, the display portion 32, a flame detector 34, a gas detector 35, and a backing plate 36. Making the ground reel 24 and the air hose reel 25 automatic reeling types prevents the ground wire and the air hose from tangling with the other hoses 41, 51, and storing the ground wire and the air hose except for filling LNG prevents vehicles from catching the wire or the hose and being damaged when moving back and forth.

The connector hook 21 is mounted to store the connector 41a attached at a tip of the recovery hose 41. In addition, the nozzle hook 22 is mounted to store the filling nozzle 51a attached at a tip of the filling hose 51, and in the nozzle hook 22 is arranged a water removal hose 22a of which an end is introduced to an outside of the filling apparatus 1. With the water removal hose 22a, in case that an interval between fillings is long, a water that is generated when a frost attached to the filling pipe 51a melts can be discharged outside, which prevents the filling nozzle 51a from getting dirty.

As described above, the temperature of the filling nozzle 51a becomes low at filling, so that operators perform filling with gloves. Then, above the nozzle hook 22 is mounted the gloves mounting part 23 for gloves 23a used by the operators (only shown in FIG. 2(a)). The gloves mounting part 23 positions as shown with the solid lines in case that the gloves 23a are put on the gloves mounting part 23a, and the gloves mounting part 23 positions as shown with the dashed line in case that the gloves 23a are not put thereon. The position as shown with the solid lines blocks detaching the filling nozzle 51a, which prevents the operators from forgetting to wear the gloves 23a.

The ground wire is mounted to prevent generation of spark by releasing electricity that is charged on the filling apparatus 1 to an outside thereof, and is stored with being reeled on the ground reel 24 (the dashed line portion shown in FIG. 2(a)). In addition, the air hose is mounted to remove dusts and frosts attached to the filling nozzle 51a before and after filling, in the same manner as the ground wire, the air hose is stored with being reeled on the air hose reel 25 (the dashed lines shown in FIG. 2(a)). With this, the ground wire, the air hose, the recovery hose 41 and the filling hose 51 can be prevented from being intertwined with each other, which prevents breakages of these components and leakages of LNG and natural gas due to their breakages.

On the front face of the housing 2 are arranged a natural gas recovery starting switch (hereinafter abbreviated as "gas recovery starting switch") 26, LNG filling starting/ending switches (hereinafter abbreviated as "filling starting/ending switches") 28, 29, an emergency stop switch 30 and a display selecting switch 31.

The display portion 32 is installed on an upper portion of the housing 2 to display unit price, filling amount and filling price of LNG. The display selecting switch 31 is arranged to switch display settings of the display portion 32, and switches displaying unit price, filling amount and filling price of LNG or displaying unit price, filling amount and filling price of light oil calculated by comparing to LNG in the same calorie. This can inform the operators how much LNG filling is cheaper than light oil fueling, which promotes the sale of LNG.

The flame detector 34 and the gas detector 35 are installed to detect flame and gas around the filling apparatus 1 respectively.

Below the pipe 54 of the filling mechanism 5 of the housing 2 is installed the backing plate 36 for preventing droplets from falling (shown in FIG. 2(b)), and a fallen water that is generated when a frost attached to the pipe 54 melts in case that an interval between the fillings is long can be led to a discharge port 37, which prevents corrosions of the pipe and others that position under the backing plate 36 in the housing 2.

The control device 6 is installed to control the whole filling apparatus 1, and as shown in FIG. 4 is provided with a recovery valve driving means 61, a recovered gas counting means 62, a shutoff valve driving means 63, a filling amount counting means 64, an actual filling amount calculation means 65 and a display portion driving means 66. In this connection, switches are abbreviated to SWs in FIG. 4.

The recovery valve driving means 61 opens the recovery valve 43 responding to the signal that is inputted from the gas recovery starting switch 26. The recovered gas counting means 62 starts count of a recovered amount responding to the signal that is inputted from the gas recovery starting switch 26, and counts the recovered gas amount responding to the signal from the flow rate pulse transmitter of the flowmeter 42.

The shutoff valve driving means 63 switches open/close of the shutoff valve 53 responding to the signals that are inputted from the filling starting/ending switches 28, 29, and closes the shutoff valve 53 responding to the signal that is inputted from the emergency stop switch 30. The filling amount counting means 64 starts count of a filling amount responding to the signal that is inputted from the filling starting switch 28, and counts the filling amount responding to the signal from the flow rate pulse transmitter of the flowmeter 52.

To the actual filling amount calculation means 65 are inputted the recovered gas amount and the filling amount counted by the recovered gas counting means 62 and the filling amount counting means 64 respectively, and the means 65 converts the inputted recovered gas amount into liquid amount, and calculates an actual filling amount by reducing the converted recovered amount from the filling amount.

The display portion control means 66 controls the display portion 32 to display the actual filling amount calculated by the actual filling amount calculation means 65.

Returning to FIG. 1, the central control board 7 is connected to the filling pump 56, the control device 6, the gas detector 35 and the flame detector 34. When flames or gases are detected around the filling apparatus by the flame detector 34 or the gas detector 35, the central control board 7 turns off the filling pump 56 in preference to the motion of the control device 6, and outputs the signal for closing the shutoff valve 53 to the shutoff valve driving means 63 of the control device 6. With this, generation and expansion of a fire disaster can be prevented.

Next, the motion of the filling apparatus 1 with the construction described above will be explained while referring FIGS. 1, 2 and 5. Switches are abbreviated to SWs in FIG. 5 also.

When a person who performs filling connects the connector 41a of the recovery hose 41 to an in-vehicle tank and depresses the gas recovery starting switch 26 (in the step S1), the recovery valve 43 opens, and the flowmeter 42 returns to zero (in the step S2).

In the step S3, whether a flow rate pulse is emitted from the flow rate pulse transmitter of the flowmeter 42 or not is judged, when the flow rate pulse is emitted (in the step S3: Yes), in the step S4, whether a flow rate is zero for a predetermined time or not is judged by the flowmeter 42, when the flow rate is not zero (in the step S4: No), the motion is returned to the step S3.

In the step S4, when the flow rate is zero for a predetermined time that is judged by the flowmeter 42 (in the step S4: Yes), the recovery valve 43 is closed to finish the recovery of natural gas (in the step S5).

After the recovery of natural gas, the person who performs filling detaches the connector 41a of the recovery hose 41 from the in-vehicle tank, and attaches the filling nozzle 51a of the filling hose 51 to the in-vehicle tank. When the person depresses the filling starting switch 28 (in the step S6), the flowmeter 52 returns to zero while considering the recovered amount, in other words, the flowmeter 52 sets the value that is the recovered amount to which a minas is attached as an initial value before counting, and the filling pump 56 turns ON to open the shutoff valve 53 (in the step S7).

In the step S8, whether a flow rate pulse is emitted from the flow rate pulse transmitter of the flowmeter 52 or not is judged, when the flow rate pulse is emitted (in the step S8: Yes), a counted value is displayed (in the step S9), in the step S10, whether the filling ending switch 29 is depressed or not is judged, when the filling ending switch 29 is not depressed (in the step S10: No), the motion is returned to the step S8.

On the other hand, in the step S8, when the flow rate pulse is not emitted, in the step S10, whether the filling ending switch 29 is depressed or not is judged, when the filling ending switch 29 is not depressed (in the step S10: No), the motion is returned to the step S8.

In the step S10, when the filling ending switch 29 is depressed (in the step S10: Yes), the filling pump 56 is turned off, and the shutoff valve 53 is closed (in the step S11) to finish the filling of LNG.

In the above embodiment, the case that the recovery hose 41 and the filling hose 51 are separately used for the recovery of natural gas and the filling of LNG, but a single hose can be used for both of the recovery and the filling. In such a case, a pipe in communication with the two-way hose is formed into a forked shape, and one pipe is used for the recovery of natural gas, and another pipe is used for the filling of LNG. With this, tangle of hoses does not occur, and the filling of LNG is carried out more safely.

Next, another embodiment of the LNG filling apparatus according to the present invention will be explained with reference to FIGS. 6 to 8.

A filling apparatus 70 according to the present embodiment is, as shown in FIG. 6, characterized by having a gas recovery ending switch 77 on the front face of the housing 2 in addition to the gas recovery starting switch 26, and other components are the same as the above embodiment, so that to the same components as the above embodiment are given the same reference numerals, and explanations thereof will be omitted.

As shown in FIG. 7, the recovery valve driving means 61 switches open/close of the recovery valve 43 (shown in FIG. 1) responding to the signals that are inputted from the gas recovery starting switch 26 and the gas recovery ending switch 77.

Next, the motion of the filling apparatus 70 with the construction described above will be explained while referring FIGS. 1, 6 to 8.

When a person who performs filling connects the connector 41a of the recovery hose 41 to an in-vehicle tank, and depresses the gas recovery starting switch 26 (in the step S11), the recovery valve 43 opens, and the flowmeter 42 returns to zero (in the step S12).

In the step S13, whether a flow rate pulse is emitted from the flow rate pulse transmitter of the flowmeter 42 or not is judged, when the flow rate pulse is emitted (in the step S13:

Yes), in the step S14, whether the gas recovery ending switch 27 is depressed or not is judged, when the gas recovery ending switch 27 is not depressed (in the step S14: No), the motion is returned to the step S13.

On the other hand, in the step S13, when the flow rate pulse is not emitted, in the same manner as the above, in the step S14, whether the gas recovery ending switch 27 is depressed or not is judged, when the gas recovery ending switch 27 is not depressed (in the step S14: No), the motion is returned to the step S13.

In the step S14, when the gas recovery ending switch 27 is depressed (step S14: Yes), the recovery valve 43 is closed to finish the recovery of natural gas (in the step S15).

The motion of the steps S16 to S21 after the recovery of natural gas is the same as the first embodiment, so that explanations thereof will be omitted.

DESCRIPTION OF THE REFERENCE NUMERALS

1 filling apparatus
2 housing
4 recovery mechanism
5 filling mechanism
6 control device
7 central control board
10 LNG storage tank
21 connector hook
22 nozzle hook
22*a* water removal hose
23 gloves mounting part
23*a* gloves
24 ground reel
25 air hose reel
26 gas recovery starting switch
27 gas recovery ending switch
28 filling starting switch
29 filling ending switch
30 emergency stop switch
31 display selecting switch
32 display portion
34 flame detector
35 gas detector
36 backing plate
37 discharge port
41 recovery hose
41*a* connector
42 flowmeter
43 recovery valve
44, 45 pipes
51 filling hose
51*a* filling nozzle
52 flowmeter
53 shutoff valve
54, 55 pipes
56 filling pump
61 recovery valve driving means
62 recovered gas counting means
63 shutoff valve driving means
64 filling amount counting means
65 actual filling amount calculation means
66 display portion driving means
70 filling apparatus
71-74 pressure gauges
77 gas recovery ending switch

The invention claimed is:

1. A liquefied natural gas filling apparatus for filling liquefied natural gas in an in-vehicle tank comprising:
   a housing;
   at least a single hose led from said housing;
   a recovery mechanism for recovering natural gas from the in-vehicle tank via said hose;
   a filling mechanism for filling liquefied natural gas in said in-vehicle tank via said hose; and
   a gloves mount for receiving gloves used by an operator of said liquefied natural gas filling apparatus, the gloves mount being attached to the housing and transitional relative to the housing between a first position and a second position, a portion of the gloves mount moving toward the housing as the gloves mount transitions from the first position toward the second position.

2. The liquefied natural gas filling apparatus as claimed in claim 1, wherein:
   the at least a single hose comprises both a recovery hose and a filling hose separately led from said housing;
   the recovery mechanism recovers natural gas from the in-vehicle tank via said recovery hose; and
   the filling mechanism fills liquefied natural gas in said in-vehicle tank via said filling hose; and
   the gloves mount preventing a filling nozzle at an end of the filling hose from being detached in case that the gloves are put on the gloves mount.

3. The liquefied natural gas filling apparatus as claimed in claim 2, wherein said recovery hose and said filling hose are separately led from the housing with these hoses in close proximity to each other.

4. The liquefied natural gas filling apparatus as claimed in claim 1, further comprising a backing plate below a filling pipe in the housing for preventing droplets from falling.

5. The liquefied natural gas filling apparatus as claimed in claim 1, further comprising:
   a ground wire for releasing electricity that is charged on the liquefied natural gas filling apparatus to an outside thereof to prevent generation of spark; and
   an air hose for removing dusts or/and frosts attached to the nozzle at the end of the hose or the filling nozzle at the end of the filling hose, wherein said ground wire and said air hose are separately reeled on reels of automatic reeling type.

6. The liquefied natural gas filling apparatus as claimed in claim 2, further comprising:
   a ground wire for releasing electricity that is charged on the liquefied natural gas filling apparatus to an outside thereof to prevent generation of spark; and
   an air hose for removing dusts or/and frosts attached to the filling nozzle at the end of the filling hose, wherein said ground wire and said air hose are separately reeled on reels of automatic reeling type.

7. The liquefied natural gas filling apparatus as claimed in claim 2, further comprising a backing plate below a filling pipe in the housing for preventing droplets from falling.

8. The liquefied natural gas filling apparatus as claimed in claim 3, further comprising a backing plate below a filling pipe in the housing for preventing droplets from falling.

9. The liquefied natural gas filling apparatus as claimed in claim 1, wherein the gloves mount is pivotally connected to the housing.

10. The liquefied natural gas filling apparatus as claimed in claim 9, wherein the gloves mount extends away from the housing when the gloves mount is in the first position and the gloves mount extends along the housing when the gloves mount is in the second position.

11. The liquefied natural gas filling apparatus as claimed in claim 10, wherein the gloves mount includes a planar body.

\* \* \* \* \*